Nov. 8, 1949     T. S. LASKY     2,487,146
OIL FILTER

Filed Sept. 29, 1947     2 Sheets—Sheet 1

Inventor
Thomas S. Lasky

By *Clarence A. O'Brien and Harvey B. Jackson*
Attorneys

Nov. 8, 1949     T. S. LASKY     2,487,146
OIL FILTER
Filed Sept. 29, 1947     2 Sheets-Sheet 2

Inventor
Thomas S. Lasky

By Clarence A. O'Brien
and Harvey B. Jacobson
Attorneys

Patented Nov. 8, 1949

2,487,146

UNITED STATES PATENT OFFICE 2,487,146

OIL FILTER

Thomas S. Lasky, Kingston, Pa.

Application September 29, 1947, Serial No. 776,776

1 Claim. (Cl. 210—62)

This invention relates to an improvement in oil filters with rechargeable or removable oil filter cartridge and improvement in the cartridge thereof designed for use with rechargeable container-type filters.

An object of the invention is to facilitate changing of the filter element without discarding the filter element container and to secure oil-tight connections at the top and bottom of the filter unit and container to prevent the escape of oil, while permitting the use of cartridges and units of different sizes.

Another object of the invention is to provide an oil filter cartridge unit which is readily mountable in a container having connections for the inlet and outlet or discharge of the oil for the purpose of filtering the same such as for use in an automobile engine, and for readily mounting the filter unit in position in the container and securing the necessary pressure to obtain oil-tight connections at the top and bottom of the filter unit, while accommodating the device to a binding post and units or filter elements of different sizes.

Another object of the invention is to provide a series of spacers machined to permit assembling of the unit, such spacers being made to required thickness to permit conversion to a unit of any desired height and for meeting the height specifications of filters of uniform diameter but differing widely in height and at the same time, securing the necessary compression for sealing the filter unit at the top and bottom of the mounting post thereof so as to adapt the same to fit most rechargeable type filters now in common use.

Other objects and advantages reside in the details of construction and operation as more fully hereinafter described and claimed, reference being had to the accompanying drawings forming part hereof, wherein like numerals refer to like parts throughout, and in which:

Figure 1:
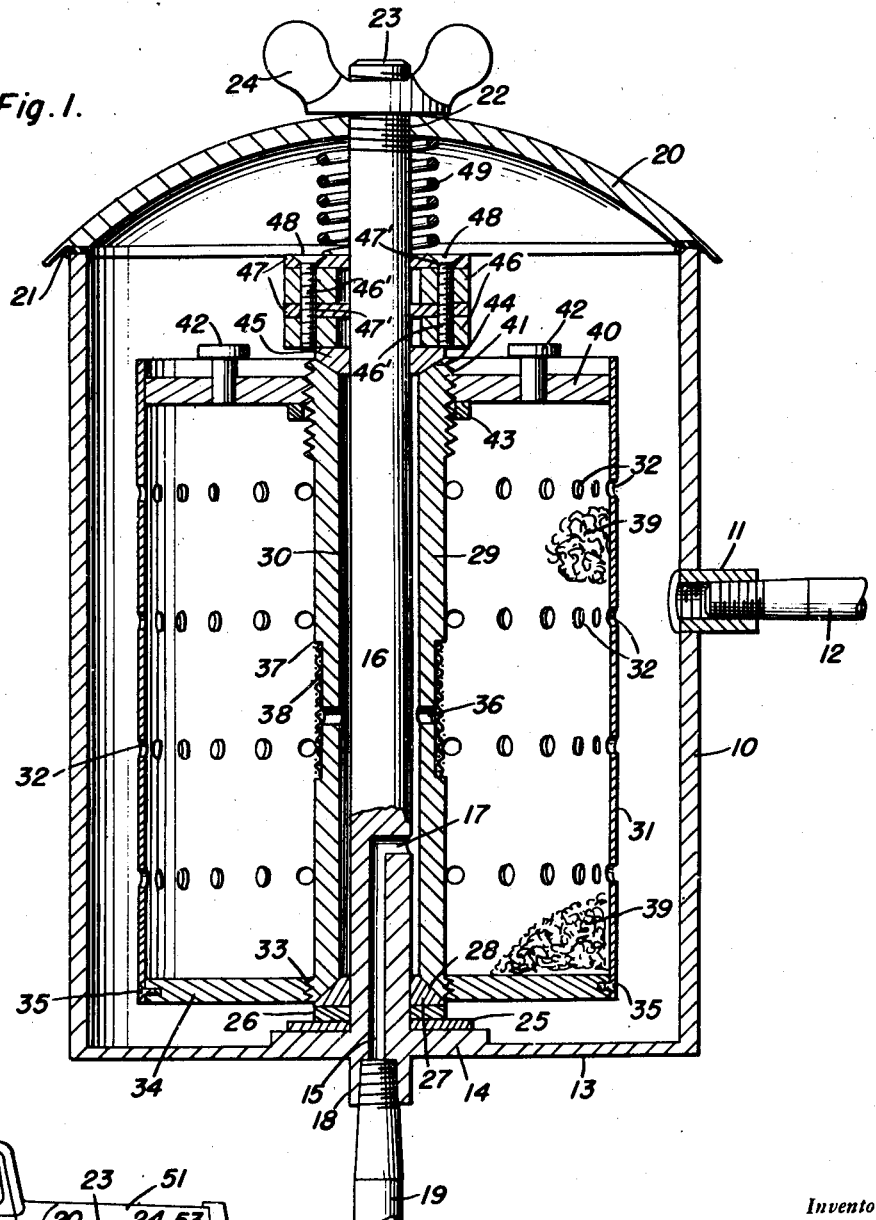
Figure 1 is a vertical sectional view of an oil filter showing the cartridge improvement in accordance with the present invention.

Referring to the drawings in detail, the device is shown as comprising an outer container 10 having a nipple or other internally threaded connection 11 at one side approximately midway of the height thereof or otherwise, for connection with the oil pipe 12 which may be an inlet or outlet. The bottom 13 of the container or casing 10 is provided with a thickened central annular portion 14 through which an axial passage 15 is made extending partially up into a central post 16 which has an outlet laterally at 17 through the periphery of the post 16 a short distance above the bottom. The post 16 may be formed integral with or separate from the bottom wall 13 at the thickened portion 14 and centrally thereof and provided with an internally threaded nipple 18 extending downwardly at the bottom for connection with an oil pipe 19, which also may be an inlet or discharge, so that the operation may be reversed in either direction.

The casing or container 10 is provided with a concavo-convex cover or lid 20 having a joint 21 fitting over the top edge thereof and a central opening 22 through which the post 16 extends and is externally threaded as indicated at 23, to take a wing or other type of nut 24 to secure the cover in position. Disposed upon the thickened portion 14 at the bottom is a washer 25 which may have a central opening of different sizes to fit a one-half inch, a five-eighths inch or a three-quarter inch post, or of other suitable diameter with or without an interposed packing ring 26. A tapered packing 27 is mounted thereon, to fit the internally tapered lower end 28 of a thick tubular member 29 which is disposed around the post 16 and in spaced concentric relation thereto to provide an annular passage 30 between the two with which the upper end of the passage 15 communicates at the lateral portion 17. The tubular portion extends upwardly from the bottom and center of a cartridge container forming part of the filter element, and indicated at 31 which has a plurality of spaced annular series of apertures or openings 32 therethrough shown arranged in four rows, although any other suitable number may be employed. As illustrated, the lower end of the tube 29 is threaded as at 33 in a central threaded opening in the thickened bottom 34 of the cartridge container 31 which is suitably secured in position to the lateral wall in any desired manner as indicated at 35 or may be formed integral therewith. The lower end of the tube is therefore tapered as at 28 to take the tapered packing 27 and insure an oil-tight connection at this point. Intermediately, the tube 29 is provided with a series or row of spaced openings or apertures 36 communicating with the space between the tube 29 and the shell 31 and also with the annular passage 30 between the tube 29 and the post 16. The periphery of the tube 29 may be annularly recessed as indicated at 37 a short distance for an area around the openings 36, to take a screen filter or the like 38 to prevent clogging of the holes or openings 36 and provide an area through which the oil may pass in either direction, depending upon whether the pipes or tubes 12 and 19 are used as inlets or outlets. The filtering material of suitable size and annular in form or otherwise, such as in the form of a cartridge indicated at 39, is mounted between the tube 29 and the shell of the cartridge container 31 and may be compressed by a top or cover 40 forming a closure for the top of the shell 31 which is threaded as at 41, on the upper end of the tube 29 and provided with suitable knobs 42 by which it may be turned to adjust the position thereof with respect to the filtering material 39 and to compress the latter at the proper degree. This also permits adjustment of the density of the filter element by regulation of pressure through the screw-threaded connection, and permits change in the filtering material or cartridge as desired. A stop nut or ring 43 may be provided on the upper threaded end of the tube 29, to hold the cover or screw top 40 in adjusted position and to set the adjustment.

Figure 6:
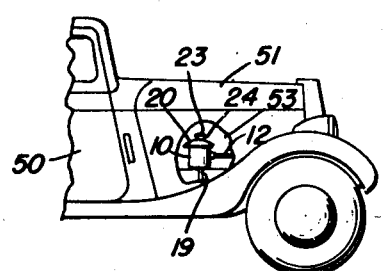
Figure 6 is a fragmentary side elevation showing the hood of an automobile broken away to disclose the mounting of the oil filter therein.
Figure 2:
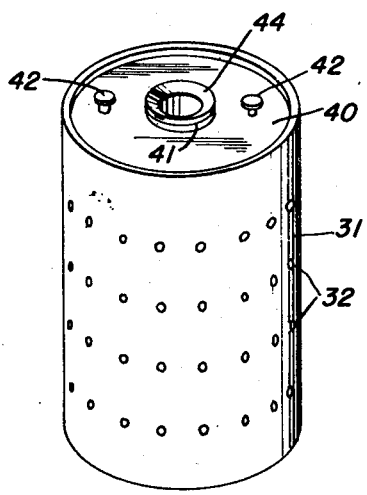
Figure 2 is a reduced perspective view of the filter element removed.
Figure 3:
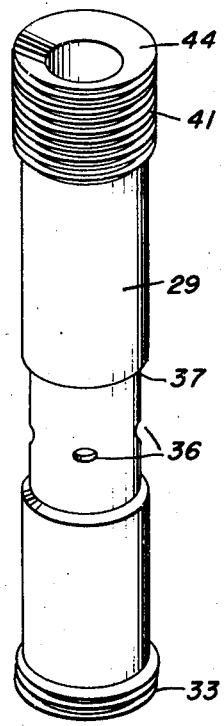
Figure 3 is a perspective view of a tubular element used in the center of the cartridge.
Figure 4:
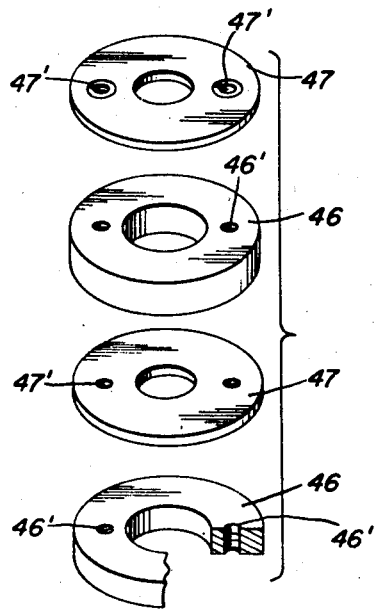
Figure 4 is an exploded view showing a sealing element at the top of the cartridge to prevent escape of oil.
Figure 5:
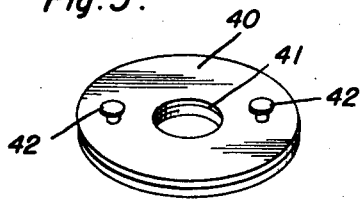
Figure 5 is a perspective view of the top closure for the filter element container.

The upper end of the tube 29 is also provided with a tapered seat 44 designed to take a tapered packing or gasket 45 similar to the parts 27 and 28 at the bottom, and spacer washers 46 may be provided on the post in connection with packing rings 47 and held together by screws 48 through threaded openings 46' and 47' therein. The washers 46 are made with central openings of different sizes so as to accommodate themselves to posts of different sizes. A spring 49 is interposed between the cover 20 and the upper washer unit to exert downward pressure thereon in conjunction with the tightening of the cover 20 by the nut 24, to secure an oil-tight seal at the upper end of the tube 29. The washers may be machined to permit assembling as a unit, the spacers differing in thickness to admit of conversion to a unit of any desired height to meet the height specifications of filters of uniform diameter but differing widely in height. It may also be pointed out that the gaskets 27 and 45 are of compressible material to be depressed into sealing position when the washers and spacers are mounted in position and compressed by the spring 49 upon the tightening of the nut 24. The spacers or washers 47 may be cut to snugly fit the post 16 whereas the spacers 46 may have central openings to fit posts of different sizes which are held assembled by the screws 48 in the manner described. By this means, provision is made for increasing or decreasing the height of the spacer elements of various types and sizes of filters while permitting the cartridge to be readily renewed or replaced when desired. Upon removing the nut 24 and cover 20, the spacer element and spring 49 may be removed, so that upon removing the adjustable closure 40 from the top of the shell 31, the filter element 39 may be readily replaced and the parts easily assembled for more efficient filtering action. Several views of the drawings show the elements in disassembled relation and Figure 6 shows an automobile 50 with the hood 51 housing the motor 53 to which the filter is applied with either tube 12 or 19 serving as inlet or outlet. Also, it is to be understood that the shell or container 31 may be any perforated container or foraminous member through which the oil may pass while retaining the filter element 39 of the usual material in position to filter the oil passing therethrough. It is also to be understood that the threaded connection of the tube 29 with the closure 40 permits compression of the filtering material 39, so as to regulate the density of said filtering element as desired. The cartridge may be built in three or more sizes to meet the requirements of the filters now in general use, namely, four, five and six inch containers with spacers for in-between fractional sizes and the direction of flow, as desired.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

An oil filter comprising an imperforate outer container having central bottom and side oil pipe connections, a solid post disposed centrally of and rigidly connected at its lower end to the bottom of said container and having an axial passage in its lower portion leading upwardly from the bottom pipe connection and a lateral passage leading from the upper end of said axial passage and opening through the periphery of the post, said post extending above the top of said container, a cover for said container fitted and removably secured on the upper end of the post, a filter unit including a cylindrical filter body container having a perforated cylindrical outer wall and a central tubular member disposed on the post and having lateral screened openings intermediate its ends, and upper and lower imperforate end walls closing the annular space between said outer wall and said tubular member, said tubular member being thick and having internally tapered ends, upper and lower tapered packing rings fitted on the post and seated in the tapered ends of said tubular member to position the latter in spaced concentric relation to the post, the lower packing ring being supported on the bottom of said outer container, a unit slidable on the post and seated on the upper packing ring, said unit comprising a plurality of alternately arranged spacer and packing washers separably secured together, the spacer washers having central openings of larger diameter than that of the post and the packing washers snugly fitting said post, and a helical compression spring on the post beneath the cover pressing downwardly on said unit to hold the packing rings seated in the end of the tubular member, said tubular member having a threaded upper end, the upper end wall of the filter body container being a removable rotatable follower plate adjustably screwed on the upper end of said tubular member and movable within the outer wall to adjust the density of a filter body placed in said filter body container.

THOMAS S. LASKY.

REFERENCES CITED

The following references are of record in the file of this patent:

UNITED STATES PATENTS

| Number | Name | Date |
|---|---|---|
| 1,249,724 | Davis | Dec. 11, 1917 |
| 1,901,484 | Winslow et al. | Mar. 14, 1933 |
| 2,076,936 | Burckhalter | Apr. 13, 1937 |
| 2,271,054 | Williams | Jan. 27, 1942 |
| 2,275,481 | Wilkinson | Mar. 10, 1942 |
| 2,337,238 | Griffith | Dec. 21, 1943 |
| 2,364,617 | Bolser | Dec. 12, 1944 |
| 2,427,733 | McCann | Sept. 23, 1947 |
| 2,429,321 | LaBrecque | Oct. 21, 1947 |